United States Patent [19]

Filipsson et al.

[11] Patent Number: 4,458,246
[45] Date of Patent: Jul. 3, 1984

[54] RADAR INSTALLATION

[75] Inventors: Hans A. V. Filipsson, Landvetter; Lars-Göran Josefsson, Lindome, both of Sweden

[73] Assignee: Telefonaktiebolaget L M Ericsson, Stockholm, Sweden

[21] Appl. No.: 368,894

[22] Filed: Apr. 15, 1982

Related U.S. Application Data

[63] Continuation of Ser. No. 195,010, filed as PCT SE 79/00185, Sep. 11, 1979, published as WO 80/00618, Apr. 3, 1980, § 102(e) date Apr. 14, 1980, abandoned.

[30] Foreign Application Priority Data

Sep. 12, 1978 [SE] Sweden .............................. 7809551

[51] Int. Cl.³ ............................................ G01S 13/02
[52] U.S. Cl. ...................................................... 343/7.6
[58] Field of Search ................................. 343/7.6, 6 A

[56] References Cited

U.S. PATENT DOCUMENTS

| | | |
|---|---|---|
| 2,980,903 | 4/1961 | Hagopian et al. ................... 343/7.6 |
| 3,289,204 | 11/1966 | Murray et al. ................... 343/7.6 X |
| 3,550,124 | 12/1970 | Heft et al. ......................... 343/7.6 X |
| 3,573,823 | 4/1971 | French ............................... 343/6 A |

FOREIGN PATENT DOCUMENTS

| | | |
|---|---|---|
| 2808544 | 8/1979 | Fed. Rep. of Germany ....... 343/7.6 |
| 2808545 | 8/1979 | Fed. Rep. of Germany ....... 343/7.6 |

Primary Examiner—T. H. Tubbesing
Attorney, Agent, or Firm—Roberts, Spiecens & Cohen

[57] ABSTRACT

A radar installation for measuring target data contains apparatus for calculating the aiming of coacting weapons for combatting targets. The installation (11) is adapted for transmitting information concerning aiming to the weapons (12–16) by having certain of its radar pulses coded with said information. The emitted pulses are only coded when the installation antenna is directed towards an information receiver at one of the weapons (12–16).

4 Claims, 3 Drawing Figures

RADAR INSTALLATION

FIELD OF THE INVENTION

This application is a continuation of application Ser. No. 195,010, filed as PCT SE 79/00185, Sep. 11, 1979, published as WO 80/00618a, Apr. 3, 1980, § 102(e) date Apr. 14, 1980, abandoned.

This invention pertains to radar installations and, more particularly, to radars which also transmit target information to receivers remote from the installation.

DESCRIPTION OF PRIOR ART

A radar installation often coacts with a fire control instrument for measuring the position and velocity of a target, and calculating how weapons shall be aimed for combatting the located target. For this purpose, the installation has to give information to weapons which can, at a distance, be grouped around it. Laying line wires for transferring information is time-consuming and therefore not always possible. Unbeamed radio transmission from the radar installation to all the weapons is easy to provide, but the connection is sensitive to intentional disturbance or jamming. Beamed radio transmission of the radio link type is more resistant to jamming, but if radio link equipment is to be added to the radar installation, the array of apparatus will be troublesomely large.

Radar installations are known which are used to send a message to a receiver within the radar's range of action besides following a body or vehicle. One such installation is provided with an apparatus for use in conjunction with a conventional radar which apparatus will use the time interval between the last desired echo signal and the following search pulse to transmit intelligence signals to an airplane or other vehicle. The installation is described in U.S. Pat. No. 2,980,903, Hagopian et al.

Radar installations are also known where the character of the pulse transmission is altered in order to have a message sent with the radar radiation to receivers in the vicinity. One such installation where the message is sent by modulation of the pulse modulation frequency(PRF) of the radar is described in U.S. Pat. 3,550,124, Heft et al.

SUMMARY OF THE INVENTION

In accordance with the present invention, the measurement pulses of electromagnetic energy conventionally radiated from the radar installation shall, per se, carry the information to be transmitted between the radar installation and coacting weapons.

The radar installation is often a search radar with a rotating antenna, which is generally placed high up on a mast. The radiated pulses are very high-powered, for which reason the information can be received by fairly small receiver antennae and simple receivers. About 10% of the pulses sent from the radar are intended to be coded with the information which is to be transmitted.

In one development of the invention, information is sent from the radar installation to a receiver only when the radar antenna is directed towards the appropriate receiver. Other information is sent to another receiver when the radar antenna is directed towards this receiver. By this mode, each particular receiver gets just the transmitted information intended for it. This is possible, since the bearing to each individual receiver is known at the radar installation, the bearings being measured when the radar installation and weapons are initially installed on their sites.

The invention is also applicable to a target tracking radar installation; a missile can be dispatched to follow the radar beam following the target, information being sent on said beam to the missile via the transmitted radar pulses.

The achievement with an installation in accordance with the invention, is that the information transfer between the installation and coacting receivers is given great resistance to intentional jamming. For search radar, the possibility of grouping the whole of the coacting weapon system in a very short time is moreover obtained.

BRIEF DESCRIPTION OF THE DRAWINGS

An example of the radar installation in accordance with the invention is described in the following, while referring to the accompanying drawing where.

PREFERRED EMBODIMENT

Figure 1:
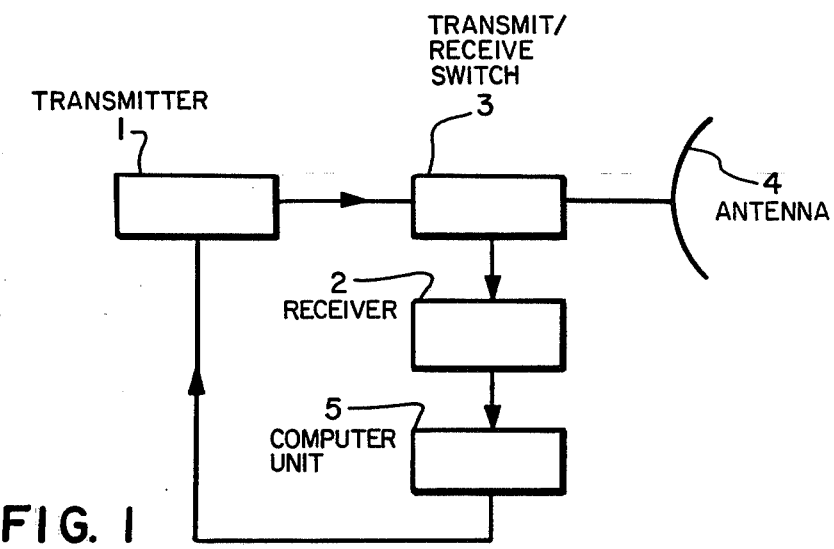
FIG. 1 is a block diagram of the radar installation.

The exemplified radar installation in accordance with the invention comprises, as illustrated in FIG. 1, a transmitter 1, a receiver 2, a transmit-receive switch 3 coupled between the transmitter and receiver, and a transmit-receive antenna 4 connected to the switch 3. The said parts of the radar installation are made conventionally, e.g. they can form a Doppler radar, and are not regarded as requiring further description. A computer unit 5 is also connected to the receiver 2, for calculating on the bases of the positions and velocities of discovered targets, the appropriate aiming of weapons, e.g. anti-aircraft guns, coacting with the radar installation. For transmitting calculated values for aiming the weapons, the computer unit 5 is linked with the radar installation transmitter 1.

Figure 2:
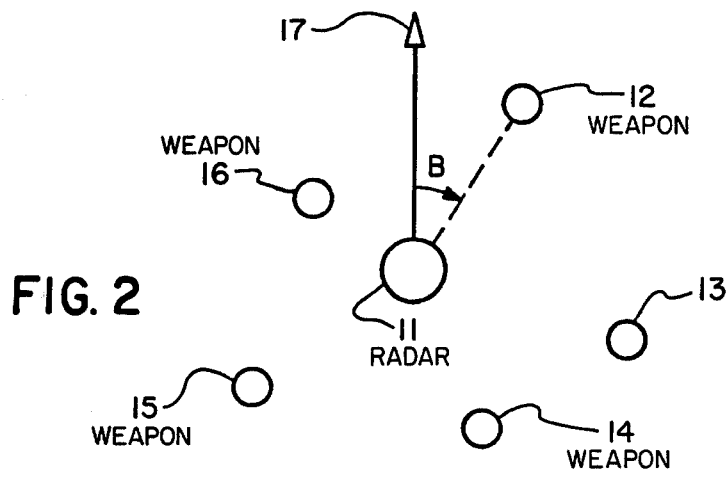
FIG. 2 illustrates grouping of the radar installation and coacting weapons.

As illustrated in FIG. 2, the radar installation 11 is surrounded by a number of weapons, in this case five anti-aircraft guns 12–16. The bearing angle B, measured from a cardinal direction 17, is stored in the radar installation and its computer unit for each weapon.

Figure 3:
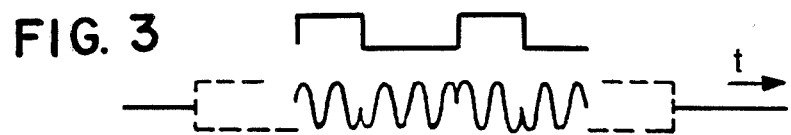
FIG. 3 illustrates modulation of a transmitted radar pulse with information.

In this case, a message for transmittance to a weapon consists of about 100 binary characters. The message includes data concerning aiming of the weapon and, inter alia, start, stop and synchronizing characters. The individual binary characters 0 and 1 are represented by separate phase directions of the alternating voltage in the radiated radar pulse in a manner which is shown in FIG. 3. The dotted frame indicates one complete radar pulse and the broken line above the frame indicates some of the binary characters of the message. Phase shifting is provided by a rapid digital phase shifter in the transmitter, incorporated in the low power side of the transmitter.

Every 10th radiated radar pulse is digitally coded with a message in the mode described.

Both the coded and uncoded pulses cause echoes when they strike a target. All the echoes received in the radar installation are used for measuring the distance, direction and velocity of the target.

What we claim is:

1. A radar installation for measuring target data by the radiation of electromagnetic energy search pulses and reception echo of pulses reflected from a target in response to a search pulse, said installation being adapted for transmitting information, calculated on the basis of measured target data, to an information receiver other than the target(12–16), remote from said installation (11), the improvement comprising means for phase modulated coding a radiated search pulse with a complete message containing the information.

2. In a radar installation for measuring target data by radiating electromagnetic energy search pulses in the form of packets of simusoidal signals toward a target and receiving electromagnetic radiation from the target echo pulses in response to the search, the method of transmitting information calculated on the basis of the measured target data to an information receiver other than the target comprising the step of phase modulation encoding the sinusoidal signals of at least one of the electromagnetic energy pulses radiated toward the target with a complete message of the information calculated on the basis of the measured target data.

3. The method of claim 2 wherein the radar installation comprises a radar antenna azimuthally sweeping a given region and a plurality of information receivers remote from the radar antenna and positioned a different azimuthal position, further comprising when the radar antenna is azimuthally aimed in a direction corresponding to one of the information receivers, the step of phase modulated encoding the packet of sinusoidal signals associated with the then transmitted energy search pulse to represent a complete message of measured target data for said one information receiver.

4. A radar installation (11) for measuring target data by emitting electromagnetic energy pulses and reception of echo pulses reflected from a target, said installation being adapted for transmitting a message containing information, for instance calculated on the basis of measured target data, to an information receiver (12–16) other than the target, remote from said installation (11), the improvement comprising means for phase modulation coding of at least two groups of sinusoids of the electromagnetic waves making up the energy pulse proper, the sinusoids of one group being out of phase with the sinusoids of the other group, one group being associated with one binary value and the other being associated with an opposite binary value, the message being a binary coded sequence.

* * * * *